United States Patent
Su

(10) Patent No.: US 6,775,380 B2
(45) Date of Patent: Aug. 10, 2004

(54) SWITCH CAPABLE OF GENERATING VOICES IN RESPONSE TO A PRESSING ACTION

(75) Inventor: Tsui-Jung Su, Hsin-Tien (TW)

(73) Assignee: Shin Jiuh Corp., Taipei Hsien (TW)

( * ) Notice: Subject to any disclaimer, the term of this patent is extended or adjusted under 35 U.S.C. 154(b) by 443 days.

(21) Appl. No.: 09/993,610

(22) Filed: Nov. 27, 2001

(65) Prior Publication Data

US 2003/0099351 A1 May 29, 2003

(51) Int. Cl.⁷ .................................................. H04M 1/00
(52) U.S. Cl. .................................. 379/433.06; 379/368
(58) Field of Search ....................... 379/433.06, 433.07, 379/368; 200/5 R

(56) References Cited

U.S. PATENT DOCUMENTS 5,703,947 A * 12/1997 Hino et al. ............. 379/433.06
6,546,231 B1 * 4/2003 Someya et al. ........ 379/433.06

* cited by examiner

Primary Examiner—Jack Chiang
(74) Attorney, Agent, or Firm—Birch, Stewart, Kolasch & Birch, LLP

(57) ABSTRACT

A switch comprises a seat, a key body, a first elastomer, a second elastomer, and a cover with an elastic portion thereon. When the key body is pushed by an applied force, an electric signal is generated for being outputted for controlling switching and various of selection functions. A neck portion of the key body has a concave portion, a plurality of convex portions are formed on the concave portion. When the key body is pushed by an applied force, the selection of icons or switching of the window can be executed. The convex point slides on the convex portions so as to generate voices; thereby, the use feeling that the switch is pressed.

2 Claims, 5 Drawing Sheets

SWITCH CAPABLE OF GENERATING VOICES IN RESPONSE TO A PRESSING ACTION

FIELD OF THE INVENTION

The present invention relates to a switch, and especially to a switch having the key body capable of generating voices; thereby, the use feeling that the switch is pressed.

BACKGROUND OF THE INVENTION

Switches are widely used in mobile phones for switching and selecting the functions of a mobile phone. Thereby, the user may operation the functions of mobile phones easily.

A prior art switch includes a seat, a key body, first elastomer, a second elastomer and a cover are assembled in the seat. When the key cap of the key body is pushed to move forwards and backwards, the neck portion of the key body will move in the space of the seat. Then the rotary portion is driven to rotate. When the rotary portion rotates, the free ends of the second elastomer extends toward the second receiving portion to contact the wall of the second receiving portion. Meanwhile, the backside of the rotary portion is firmly secured to the contact ends of the first elastomer. The contact ends are in contact with the wires in the first receiving portion. Thus, an electric signal can be outputted for controlling the selection items of various functions and switching of the functions.

Although this kind of switch causes the users to use the window easily, the users will not feel that the switch is pressed. Therefore, no real touches for feeling.

SUMMARY OF THE INVENTION

Accordingly, the primary object of the present invention is to provide a switch comprises a seat, a key body, a first elastomer, a second elastomer, and a cover with an elastic portion thereon. When the key body is pushed by an applied force, an electric signal is generated for being outputted for controlling switching and selection of various functions. A neck portion of the key body has a concave portion, a plurality of convex portions are formed on the concave portion. When the key body is pushed by an applied force. The convex point slides on the convex portions so as to generate voices; thereby, the use feeling that the switch is pressed.

The various objects and advantages of the present invention will be more readily understood from the following detailed description when read in conjunction with the appended drawing.

DETAILED DESCRIPTION OF THE PREFERRED EMBODIMENTS

Figure 1:
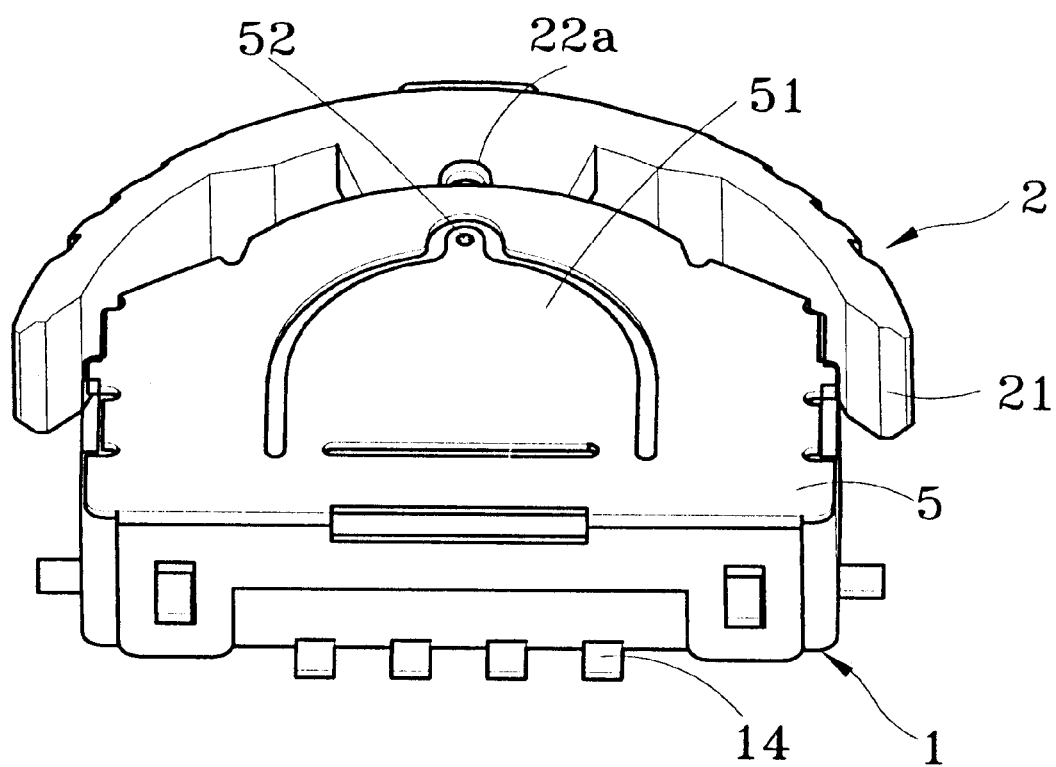
FIG. 1 is a schematic view of the present invention.
Figure 2:
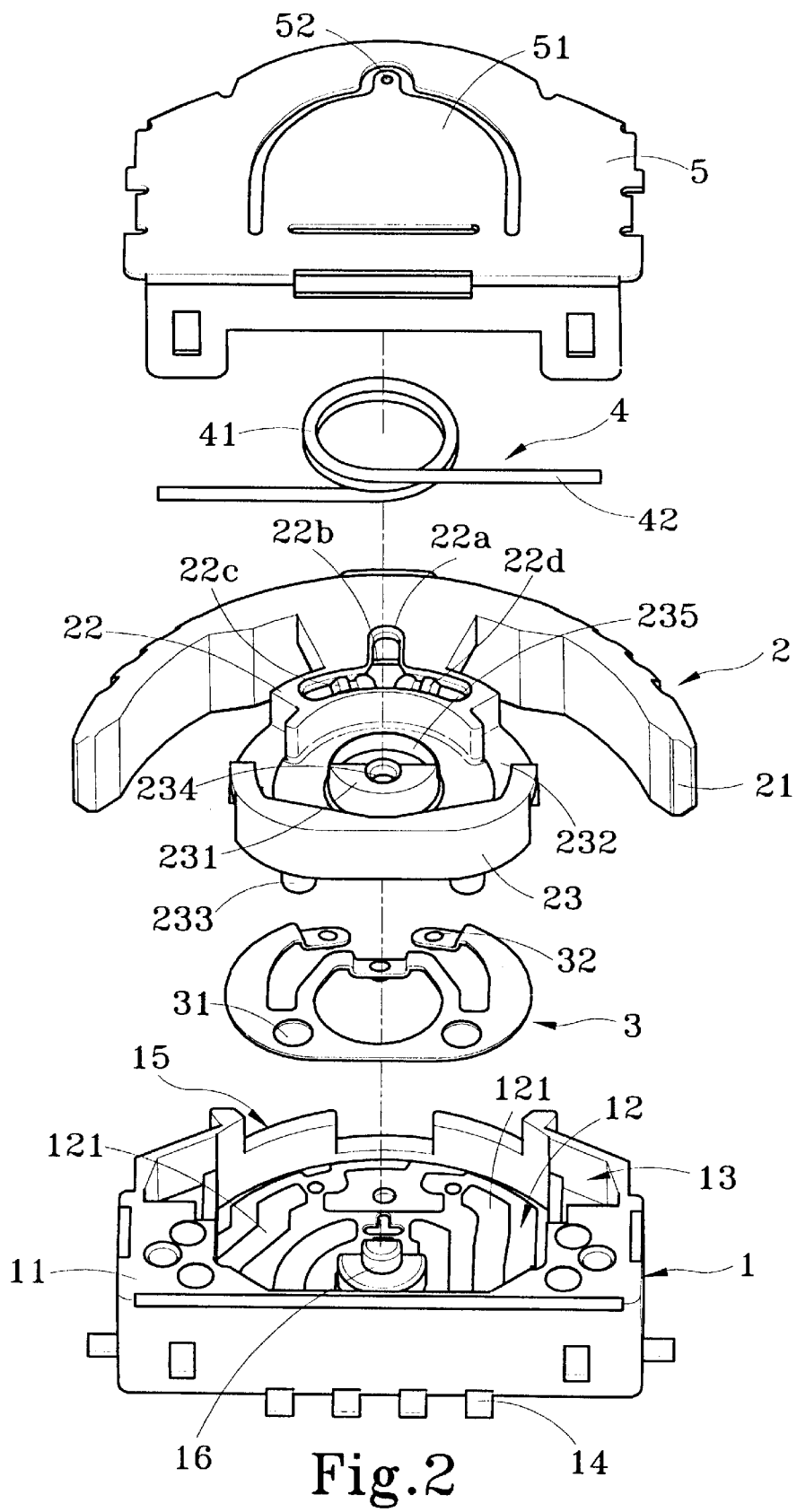
FIG. 2 is an exploded perspective view of the present invention.
Figure 3:
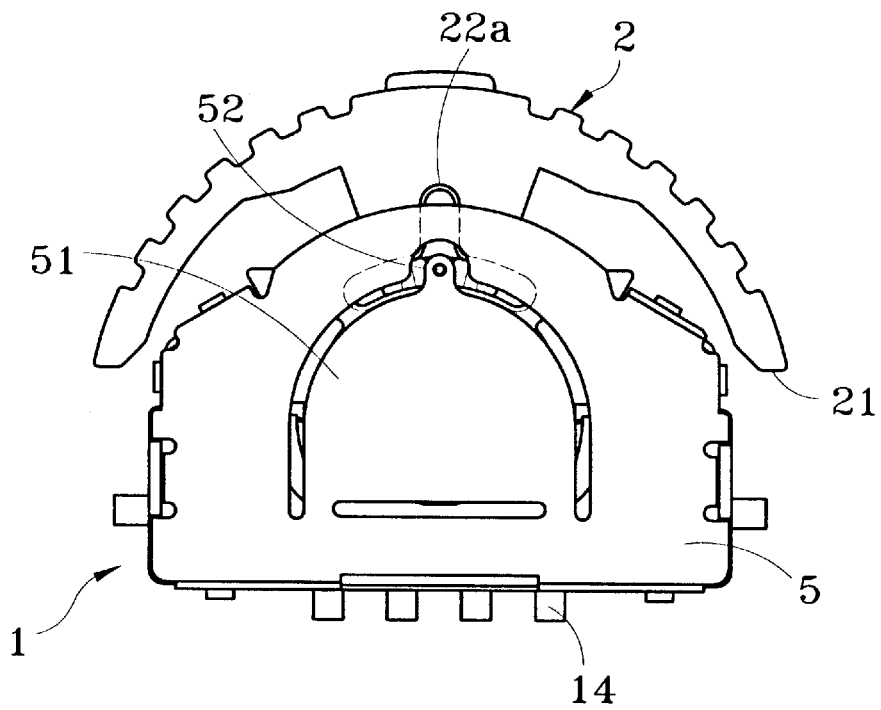
FIG. 3 is a lateral view of the present invention.
Figure 4A:
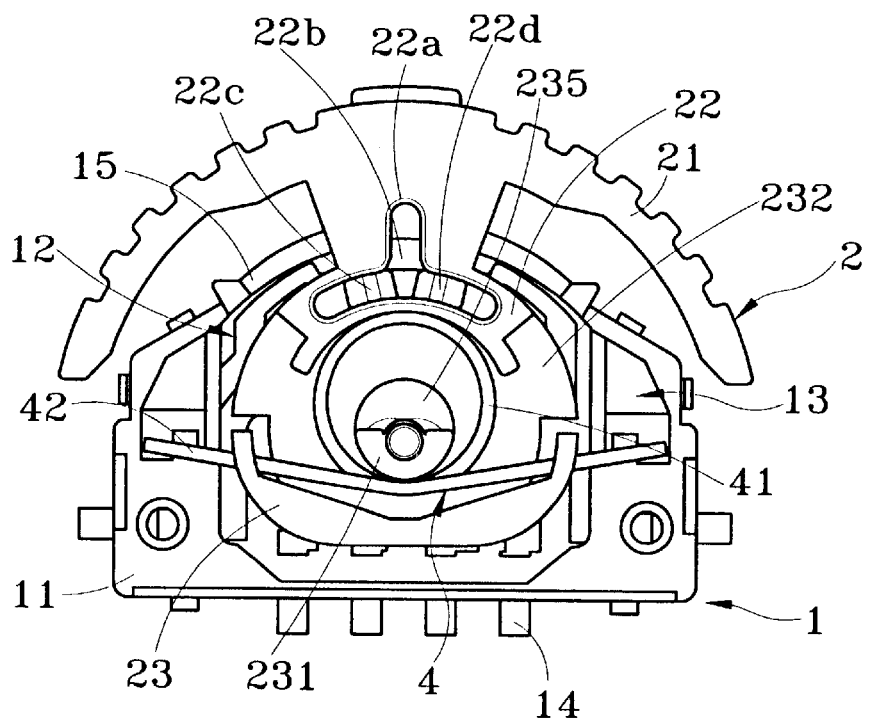
FIGS. 4A, 4B, 4C is a schematic view showing the operation of the present invention.
Figure 4B:
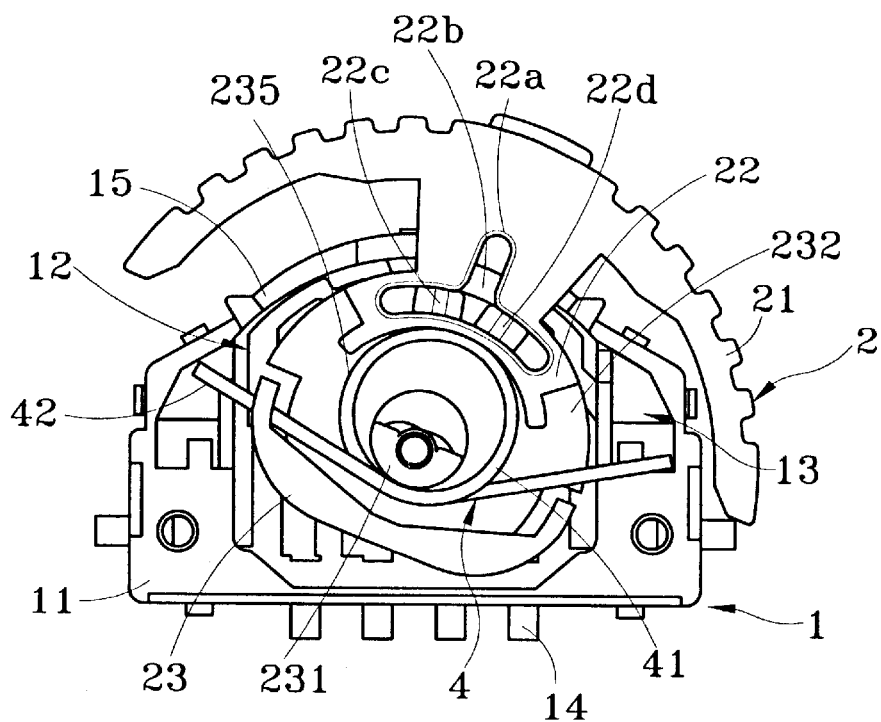
Figure 4C:
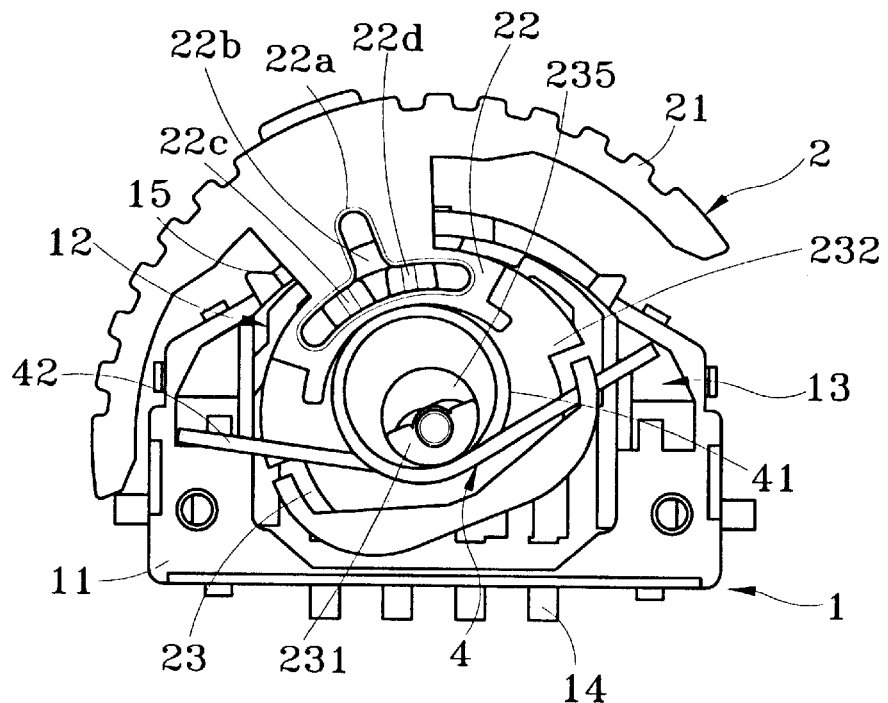

Referring to FIGS. 1, 2 and 3, the perspective view, exploded view, and lateral view of the present invention are illustrated. The switch of the present invention includes a seat 1, a key body 2, a first elastomer 3, a second elastomer 4, and a cover 5 for controlling the switching and selection of various functions. In operation, the user presses the key body 2 to move so as to generate some voice. Thereby, the user feels that the key is pressed.

The above seat 1 has a thick portion 11. The thick portion 11 is formed as a first receiving portion 12 and a second receiving portion 13. The bottom of the first receiving portion 12 has a conductive wire 121. The conductive wire 121 is communicated with pins 14 on the thick portion 11. Thereby, an input end and an output end of power are formed. The thick portion 11 has a space 15 at position with respect to the first receiving portion 12 for moving the key body 2. The first receiving portion 12 has a pivot shaft 16 that is pivotally connected to the key body 2.

The key body 2 has a cambered key cap 21. The key cap 21 is connected with a neck portion 22. The neck portion 22 is connected to a rotary portion 23. The rotary portion 23 is protruded with a pivot portion 231 pivotally connected to the pivot shaft 16. The periphery of the pivot portion 231 is formed with an active portion 232. A center of the pivot portion 231 is installed with a position hole 234. One side of the position hole 234 has a cambered sliding portion 235. Moreover, the neck portion 22 is formed with a concave portion 22a. The concave portion 22a is embedded with different convex portions 22b, 22c and 22d.

The first elastomer 3 has a symmetric positioning portion 31. This positioning portion 31 positions a convex portion 233 on the backside of the rotary portion 23. The first elastomer 3 is extended with a set of symmetric contact ends 32. These contact ends 32 rotate with the rotation of the rotary portion 23 so as to contact the wires in the first receiving portion 12. Thus, a signal about the operation of the key body 2 is generated.

The second elastomer 4 is arranged on the active portion 232 and has a winding portion 41. The winding portion 41 is arranged on the outer edge of the pivot portion 231. Two free ends 42 of the winding portion 41 are pivotally connected to the first receiving portion 12.

The cover 5 covers the surface of the thick portion 11 of the seat 1. The cover 5 has an elastic portion 51. The elastic portion 51 has a convex point 52 protruding toward another surface of the cover 5. The convex point 52 of the elastic portion 51 is in the concave portion 22a.

Referring to FIGS. 3, 4A, 4B and 4C, the lateral view and schematic view of the present invention is illustrated. As shown in the drawings, the key body 2, first elastomer 3, and second elastomer 4 are assembled in the seat 1. When the key cap 21 of the key body 2 is pushed to move forwards and backwards, the neck portion 22 of the key body 2 will move in the space 15 of the seat 1. Then the rotary portion 23 is driven to rotate. When the rotary portion 23 rotates, the free ends 42 of the second elastomer 4 extend toward the second receiving portion 13 to contact the wall of the second receiving portion 13. Meanwhile, the backside of the rotary portion 23 is firmly secured to the contact ends 32 of the first elastomer 3. The contact ends 32 are contact with the wires in the first receiving portion 12. Thus, an electric signal can be outputted for controlling the selection items of various functions and switching of the functions.

When the key body 2 is not pushed by an applied force, the convex point 52 on the elastic portion 51 of the cover 5 is at an center of the convex portions 22b, 22c and 22d. When the key body 2 is pushed by an applied force to be moved leftwards and rightwards. The convex point 52 slides on the convex portions 22c and 22d so as to generate voices. Moreover, when the key body 2 is pressed, the convex point 52 slides on the concave portion 22b so as to generate voice. Thereby, the use feels that the switch is pressed.

Figure 5:
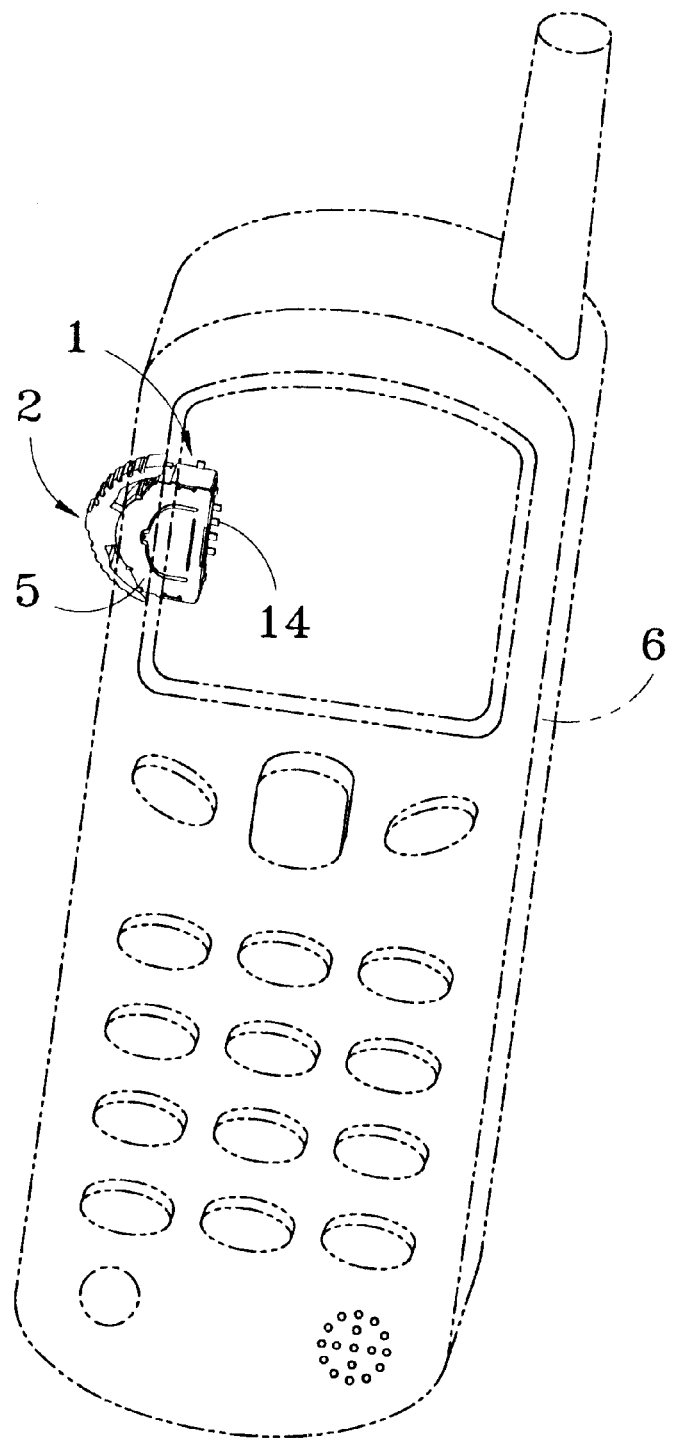
FIG. 5 is a schematic view showing the condition of the present invention.

With reference to FIG. 5, a schematic view showing the application of the present invention is illustrated. As shown in the drawings, the switch of the present invention can be utilized in keyboards, notebook computers, or palmtop computers, or mobile phones 6. When the key body 2 of the switch is pushed by an applied force, the selection of icons or switching of the window can be executed.

Although the present invention has been described with reference to the preferred embodiments, it will be understood that the invention is not limited to the details described thereof. Several of substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A switch comprising a seat, a key body, a first elastomer, a second elastomer, and a cover with an elastic portion thereon, wherein when the key body is pushed by an applied force, an electric signal is generated for being outputted for controlling switching and various of selection functions; a neck portion of the key body has a concave portion, a plurality of convex portions are formed on the concave portion; when the key body is pushed by an applied force; the convex point slides on the convex portions so as to generate voices; thereby, the use feels that the switch is pressed.

2. The switch as claim in claim 1, wherein the switch is utilized in one of a group of containing keyboards, notebook computers, palmtop computers, or mobile phones.

* * * * *